US008606510B2

(12) United States Patent
Lin

(10) Patent No.: US 8,606,510 B2
(45) Date of Patent: Dec. 10, 2013

(54) METHODS AND SYSTEMS FOR ADJUSTING ROUTE PLANNING RESULTS

(75) Inventor: Yen-Hung Lin, Kaohsiung (TW)

(73) Assignee: Mitac International Corp., Taoyuan (TW)

( * ) Notice: Subject to any disclaimer, the term of this patent is extended or adjusted under 35 U.S.C. 154(b) by 851 days.

(21) Appl. No.: 12/332,888

(22) Filed: Dec. 11, 2008

(65) Prior Publication Data

US 2009/0265092 A1 Oct. 22, 2009

(30) Foreign Application Priority Data

Apr. 22, 2008 (TW) ................................ 97114617 A

(51) Int. Cl.
*G01C 21/36* (2006.01)

(52) U.S. Cl.
USPC .......................... 701/411; 701/418; 340/995.1

(58) Field of Classification Search
USPC ......... 701/201, 202, 209, 210, 211, 206, 533, 701/411, 418; 340/995.1
See application file for complete search history.

(56) References Cited

U.S. PATENT DOCUMENTS

| | | | | |
|---|---|---|---|---|
| 5,340,061 | A * | 8/1994 | Vaquier et al. | 244/175 |
| 6,188,957 | B1 * | 2/2001 | Bechtolsheim et al. | 701/209 |
| 6,263,278 | B1 * | 7/2001 | Nikiel et al. | 701/210 |
| 2007/0038367 | A1 * | 2/2007 | Froeberg | 701/202 |
| 2008/0208457 | A1 * | 8/2008 | Reed et al. | 701/208 |

* cited by examiner

*Primary Examiner* — Thomas Tarcza
*Assistant Examiner* — Adam Tissot

(57) ABSTRACT

Methods and systems for adjusting route planning results are provided. First, a first route planning result is generated, and displayed. Then, at least one candidate road section is selected and dragged to a substituted road section. A second route planning result is re-generated according to the substituted road section. The second route planning result passes through the substituted road section, and the candidate road section is excluded from the second route planning result.

18 Claims, 5 Drawing Sheets

METHODS AND SYSTEMS FOR ADJUSTING ROUTE PLANNING RESULTS

CROSS REFERENCE TO RELATED APPLICATIONS

This Application claims priority of Taiwan Patent Application No. 097114617, filed on Apr. 22, 2008, the entirety of which is incorporated by reference herein.

BACKGROUND OF THE INVENTION

1. Field of the Invention

The disclosure relates generally to methods and systems for adjusting route planning results, and, more particularly to methods and systems that directly adjusts route planning results by selection and drag command functions.

2. Description of the Related Art

Recently, wireless positioning technology, such as a GPS (Global Positioning System), has become a popular application for electronic devices, such as computers and portable devices. The GPS can receive signals from satellites, and accordingly determine the position of the electronic device. Users can also use navigation software in the electronic device for route planning and navigation.

Generally, related navigation software plans routes according to road levels and some specific parameters. Although users can obtain different route planning results by inputting various parameters, practically, however, the route planning results always cannot provide 100 percent user satisfaction.

Currently, some navigation software may provide a function to avoid specific roads. Users can set what specific roads are to be avoided in advance, and the navigation software can plan routes by excluding the specific roads. Although specific roads can be set to be avoided in advance, however, the route planning results excluding the specific roads may not necessarily conform to users' expectation.

Additionally, some navigation software may provide a pass-through function to pass-through specific points/roads. Users can set specific points or roads to be passed-through in advance, and the navigation software can plan routes by including the specific points or roads. Although specific points or roads can be set to be passed-through in advance, however, the settings and cancellation of pass-through points or roads on current interfaces provided by the navigation software are complicated, and inconvenient for users. Further, the pass-through function does not consider different lane directions, thus resulting in inappropriate roads being chosen for route planning, or detouring.

U.S. Pat. No. 6,263,278 is an example of a system providing a pass-through function, and provides a graphic interface allowing a user to graphically indicate the portion of the route to alter. In U.S. Pat. No. 6,263,278, an additional destination can be included to visit in a pre-calculated route. A portion of a link can be selected and dragged to the additional destination, and new links connected to the additional destination are calculated. It is understood that, in U.S. Pat. No. 6,263,278, additional destinations can be included into a pre-calculated route, however, specific roads which expected to be avoided still may be existed in the new-calculated route. No where in U.S. Pat. No. 6,263,278 does it disclose any specific road to be avoided.

BRIEF SUMMARY OF THE INVENTION

Methods and systems for adjusting route planning results are provided.

In an embodiment of a method for adjusting route planning results, a first route planning result is generated, and displayed. Then, at least one candidate road section in the first route planning result is selected, and dragged to a substituted road section. A second route planning result is re-generated according to the substituted road section. The second route planning result passes through the substituted road section, and the candidate road section is excluded from the second route planning result.

An embodiment of a system for adjusting route planning results comprises a display unit and a processing unit. The processing unit generates a first route planning result, and displays the first route planning result via the display unit. The processing unit receives a selection and a drag corresponding to at least one candidate road section in the first route planning result. When the candidate road section is dragged to a substituted road section, the processing unit re-generates a second route planning result according to the substituted road section. The second route planning result passes through the substituted road section, and the candidate road section is excluded from the second route planning result.

Methods and systems for adjusting route planning results may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for adjusting route planning results are provided.

Figure 1:
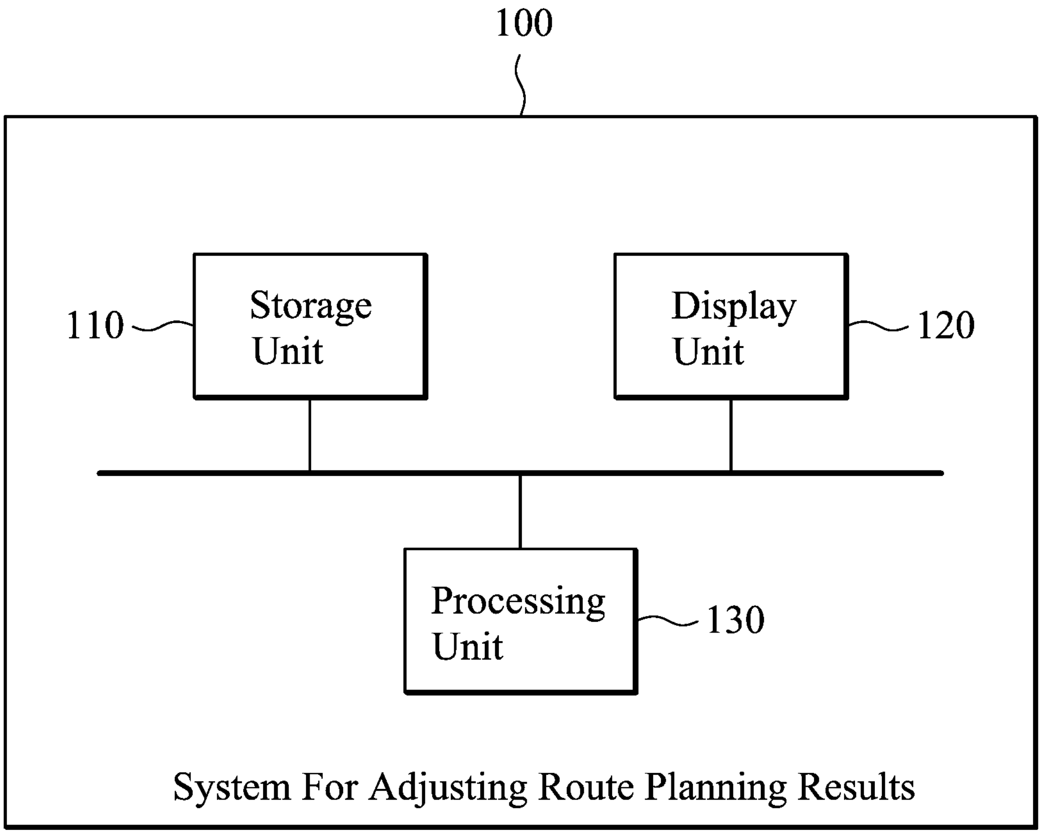
FIG. 1 is a schematic diagram illustrating an embodiment of a system for adjusting route planning results of the invention.

FIG. 1 is a schematic diagram illustrating an embodiment of a system for adjusting route planning results of the invention. The system for adjusting route planning results is suitable for use in an electronic device, such as a computer system or a portable device having a navigation function.

The system for adjusting route planning results 100 comprises a storage unit 110, a display unit 120, and a processing unit 130. The storage unit 110 comprises map data corresponding to at least one specific region. The map data can comprise doorplate addresses, landmarks, scenic spots, and/or roads and information thereof, such as the name of the road, road sections in the road, and lane direction of the road, such as a one-way or two-way. The display unit 120 displays related data, such as a user interface, and route planning results. Users can input navigation parameters, such as a starting point, a destination point, and/or at least one pass-through point via the user interface. It is understood that, in some embodiments, the display unit 120 may have a touch-sensitive screen. That is, the system can display related data via the display unit 120, and users can input data directly via the display unit 120. The processing unit 130 can be a navigation engine having a route planning capability. The processing unit 130 performs route planning according to the navigation parameters, and performs the method for adjusting route planning results of the invention. Related detail is discussed later.

Figure 2:
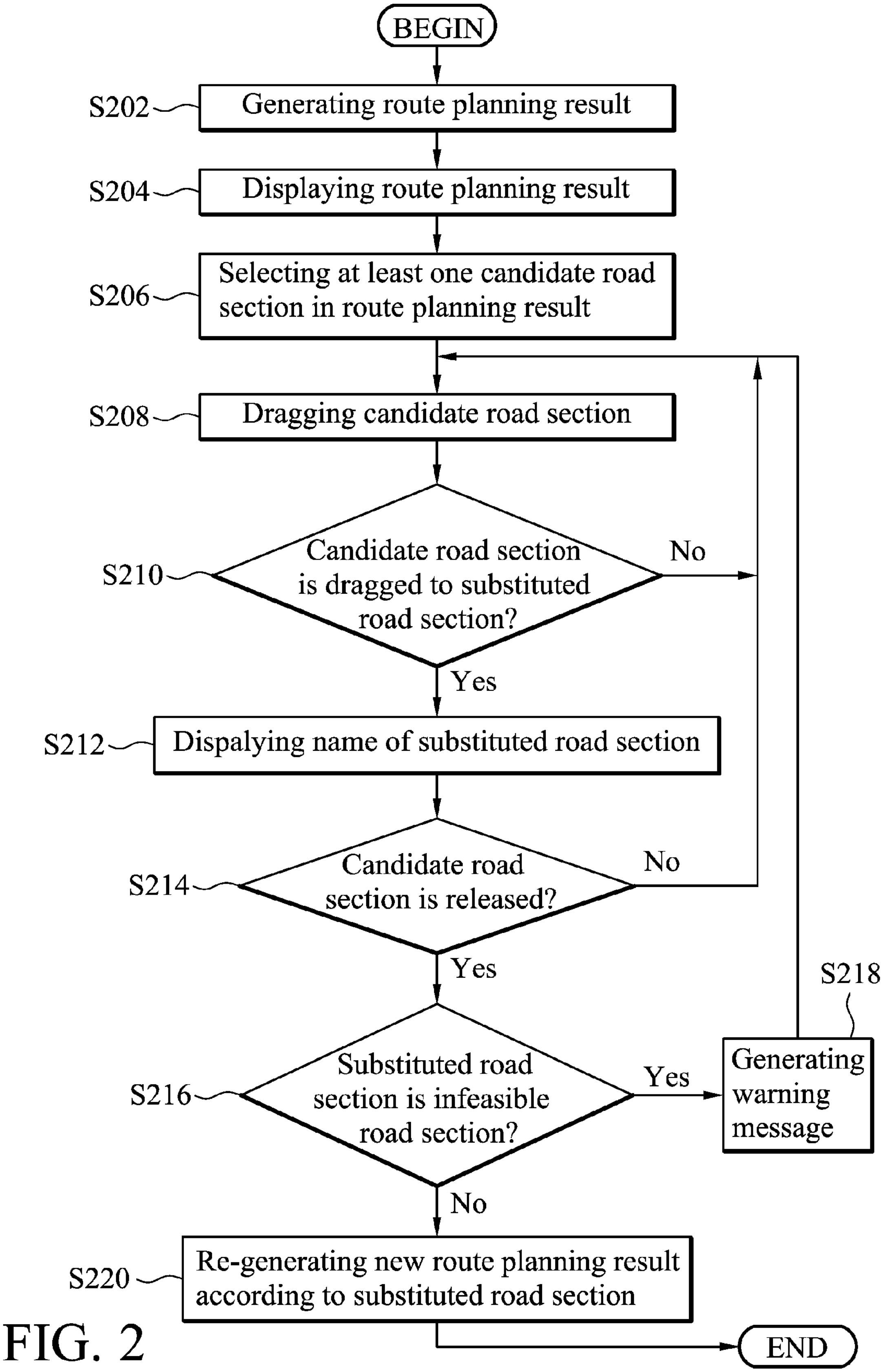
FIG. 2 is a flowchart of an embodiment of a method for adjusting route planning results of the invention.

FIG. 2 is a flowchart of an embodiment of a method for adjusting route planning results of the invention. The method for adjusting route planning results is suitable for use in an electronic device, such as a computer system or a portable device having a navigation function.

In step S202, the electronic device generates a route planning result, and in step S204, displays the route planning result in the display unit. As described, users can input navigation parameters, such as a starting point, a destination point, and/or at least one pass-through point via the user interface. The electronic device can plan a route according to the navigation parameters to obtain the corresponding route planning result. In step S206, at least one candidate road section which the user does not want to pass-through is selected from the route planning result. It is understood that the candidate road section can be an entire road or a specific portion of a road. In some embodiments, the road can be defined in nodes (connection points). That is, several nodes (connection points) can be on a road. A portion between any two nodes (connection points) forms a road section. Additionally, when the display unit is a touch-sensitive display unit, the candidate road section can be selected directly from the touch-sensitive display unit. It is noted that, in some embodiments, a mode of route adjustment can be first entered before the selection of candidate road sections in case it conflicts with other functions, such as a map drag command function.

When the candidate road section is selected, in step S208, the candidate road section is dragged. In step S210, it is determined whether the candidate road section is dragged to any other road section (substituted road section). If not (No in step S210), the procedure returns to step S208. When the candidate road section is dragged to a substituted road section (Yes in step S210), in step S212, the name of the substituted road section is displayed in the display unit. Then, in step S214, it is determined whether the selection of the candidate road section is released. If the selection of the candidate road section is not released (No in step S214), the procedure returns to step S208. If the selection of the candidate road section is released (Yes in step S214), in step S216, it is determined whether the substituted road section is an infeasible road section. In some embodiments, various navigation modes, such as a car mode, a bus mode, and a motorcycle mode can be provided in the system. The determination of whether the substituted road section is an infeasible road section can be performed by determining whether a current navigation mode is a motorcycle mode, and whether the substituted road section is a freeway. If the current navigation mode is a motorcycle mode, and the substituted road section is a freeway, it is determined that the substituted road section is an infeasible road section. In some embodiments, the determination of whether the substituted road section is an infeasible road section can be performed by determining whether the substituted road section is a one-way road, and whether the one-way road causes a detour requirement. It is noted that, the detour requirement means the distance between the starting point and the destination point is increased. If the substituted road section is a one-way road, and the detour requirement occurs, it is determined the substituted road section is an infeasible road section. It is understood that, the above determinations of whether the substituted road section is an infeasible road section are only examples of the application, and the application is not limited thereto. The conformation conditions of whether the substituted road section is an infeasible road section can be defined according to various requirements.

When the substituted road section is an infeasible road section (Yes in step S216), in step S218, a warning message is generated and displayed, and the procedure returns to step S208. When the substituted road section is not an infeasible road section (No in step S216), in step S220, a new route planning result is re-generated according to the substituted road section, and displayed in the display unit. In some embodiments, the route planning result can comprise the distance between the starting point and the destination point. It is understood that, the new route planning result passes through the substituted road section, and the selected candidate road section is excluded from the new route planning result. It is noted that, the generation of the new route planning result simultaneously achieved two results: first, the new route planning result is re-generated by passing through the substituted road section; and second, the selected candidate road section is excluded from the new route planning result. Additionally, when the new route planning result is re-generated according to the substituted road section, the substituted road section can be set as a plurality of pass-through points, and the new route planning result is obtained according to the starting point, the destination point, and the plurality of pass-through points. In some embodiments, when the substituted road section comprises several nodes (connection points), all of the nodes (connection points) are set as the pass-through points. In some embodiments, when the substituted road section is a two-way road, a specific lane direction can be selected from the two-way lanes into the new route planning result, wherein the specific lane direction is the same with the lane direction from the starting point to the destination point. When the user satisfies the new route planning result, a navigation key can be pressed to begin the navigation.

Figure 3:
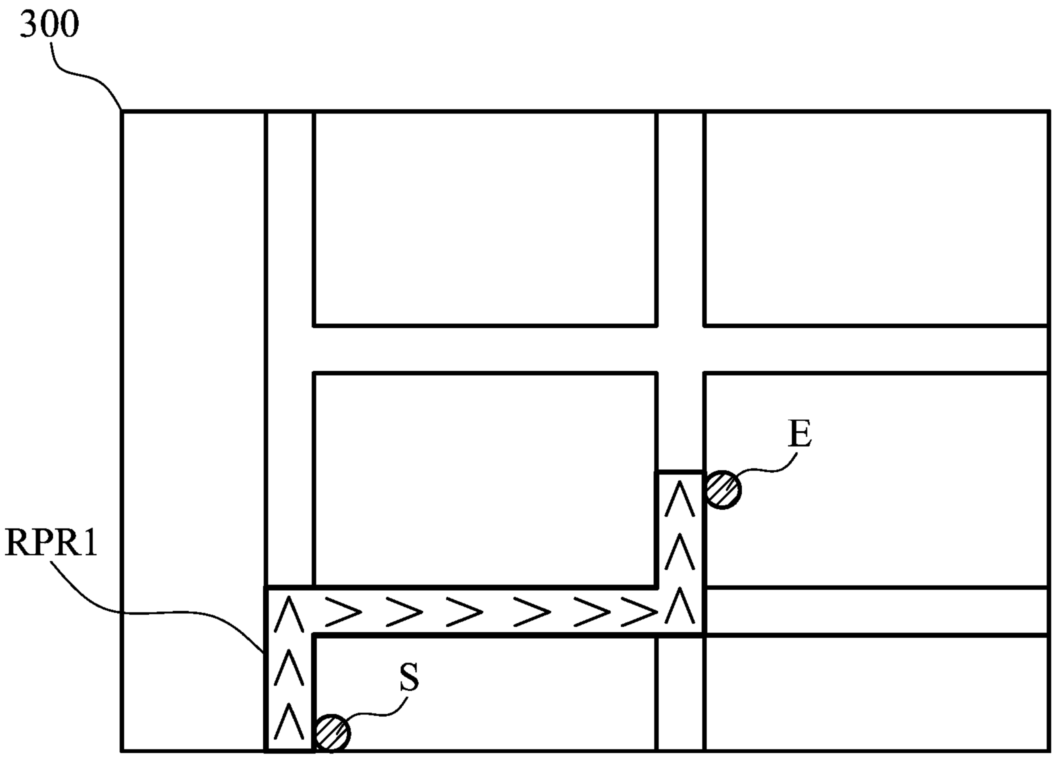
FIG. 3 is a schematic diagram illustrating an embodiment of a route planning result of the invention.
Figure 4A:
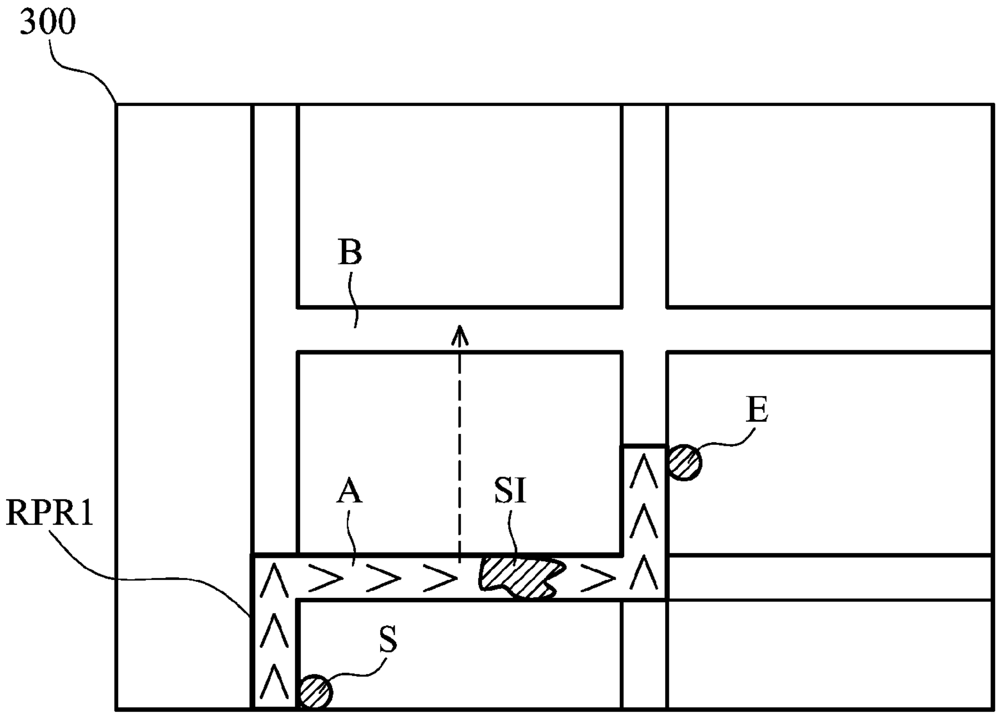
FIGS. 4A and 4B are schematic diagrams illustrating an embodiment of an adjustment of a route planning result of the invention.
Figure 4B:
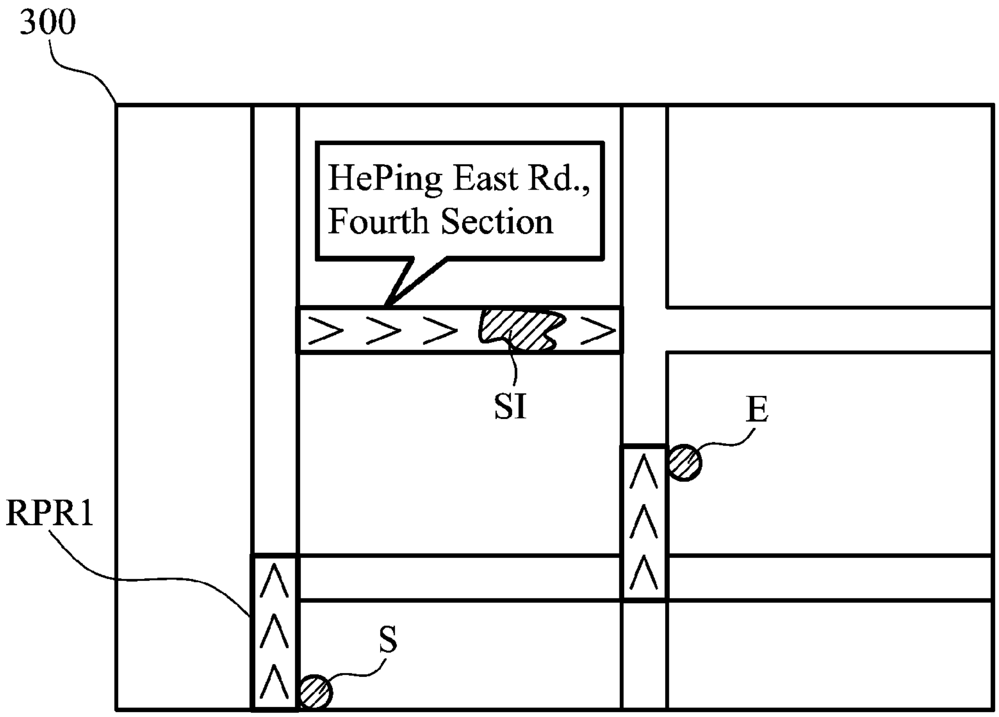
Figure 5:
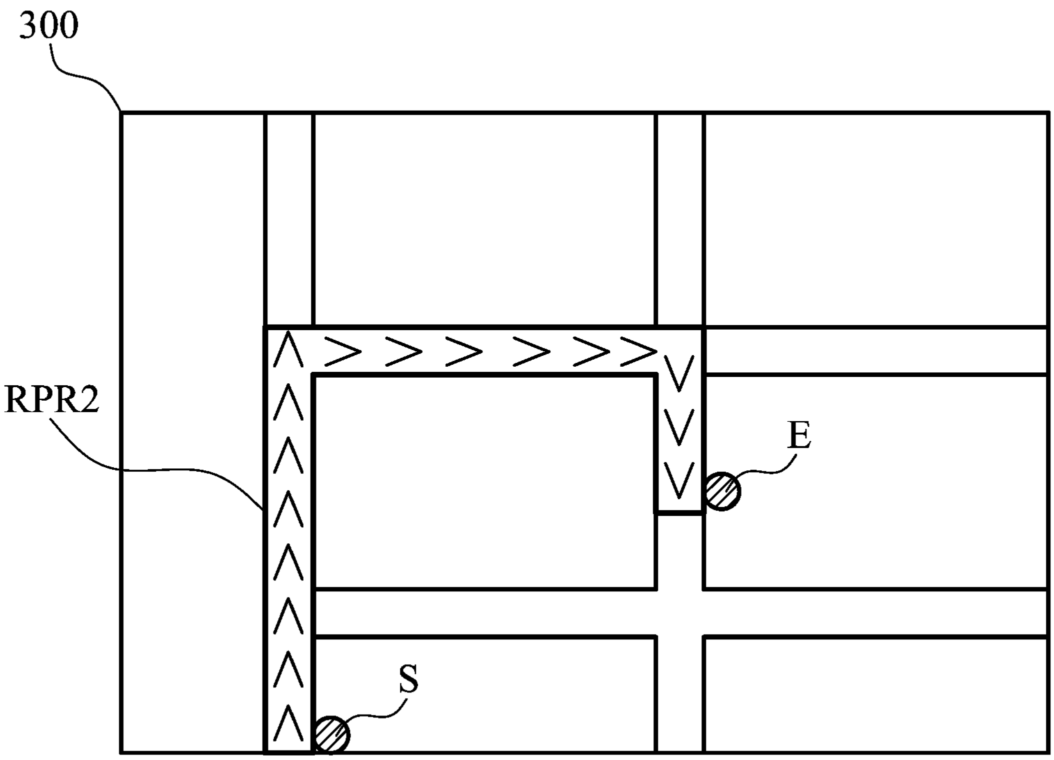
FIG. 5 is a schematic diagram illustrating an embodiment of a new route planning result generated after the adjustment of a route planning result of the invention.

Following is an example. FIG. 3 is a schematic diagram illustrating an embodiment of a route planning result RPR1 of the invention. The route planning result RPR1 can be displayed in a touch-sensitive display unit 300, wherein 'S' is the stating point, and 'E' is the destination point. When the user wants to adjust the route planning result RPR1, a candidate road section A can be selected directly via the touch-sensitive display unit 300, wherein 'SI' is a selection mark, as shown in FIG. 4A. Thereafter, the candidate road section A is dragged to a substituted road section B. When the candidate road section A is dragged to the substituted road section B, the name of the substituted road section B is shown in the touch-sensitive display unit 300. In this example, the name of the substituted road section B is 'HePing East Rd., fourth section', as shown in FIG. 4B. When the user releases the selection of the candidate road section, the route planning is re-performed according to the starting point, the destination point, and the substituted road section B, thus to obtain a new route planning result RPR2, as shown in FIG. 5.

Therefore, the methods and systems for adjusting route planning results can easily adjust route planning results by selection and drag command functions. The adjusted route planning result will also be a feasible route planning result.

Methods and systems for adjusting route planning results, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for adjusting route planning results for use in an electronic device, comprising:

generating a first route planning result by the electronic device, wherein the first route comprises a starting point, a destination point, and a plurality of pass-through points there between;

displaying the first route planning result;

selecting at least one candidate road section in the first route planning result, wherein the candidate road section is a portion of a road in the first route planning result extending between two of the pass-through points of the first route;

dragging the candidate road section to a substituted road section, wherein the substituted road section is a portion of a road extending between two pass-through points that are not pass-through points of the first route; and re-generating a second route planning result according to the substituted road section, wherein the second route planning result passes through the substituted road section, and the candidate road section is excluded from the second route planning result.

2. The method of claim 1, wherein the first route planning result is displayed in a touch-sensitive display unit of the electronic device, and the candidate road section is selected directly via the touch-sensitive display unit.

3. The method of claim 1, further comprising displaying a name of the substituted road section when the candidate road section is dragged to the substituted road section.

4. The method of claim 1, further comprising releasing the candidate road section after the candidate road section is dragged to the substituted road section, and then enabling the generation of the second route planning result according to the substituted road section.

5. The method of claim 1, wherein the second route planning result is generated according to at least the starting point, the destination point, and the two pass-through points of the substituted road section.

6. The method of claim 5, further comprising determining whether the substituted road section is a two-way road, and when the substituted road section is a two-way road, selecting a specific lane direction from the two-way road for the second route planning result, wherein the specific lane direction is the same with the lane direction from the starting point to the destination point.

7. A system for adjusting route planning results for use in an electronic device, comprising:

a display unit; and a processing unit configured to:

generate a first route planning result, wherein the first route comprises a starting point, a destination point, and a plurality of pass-through points there between, display the first route planning result in the display unit, receive a selection and a drag corresponding to at least one candidate road section in the first route planning result being dragged to a substituted road section, wherein the candidate road section is a portion of a road in the first route planning result extending between two of the pass-through points of the first route, and wherein the substituted road section is a portion of a road extending between two pass-through points that are not pass-through points of the first route, re-generate a second route planning result according to the substituted road section, wherein the second route planning result passes through the substituted road section, and the candidate road section is excluded from the second route planning result.

8. The system of claim 7, wherein the processing unit further displays a name of the substituted road section in the display unit when the candidate road section is dragged to the substituted road section.

9. The system of claim 7, wherein the processing unit further detects a release of the candidate road section after the candidate road section is dragged to the substituted road section, and then enabling the generation of the second route planning result according to the substituted road section.

10. The system of claim 7, wherein the second route planning result is generated according to at least the starting point, the destination point, and the two pass-through points of the substituted road section.

11. The system of claim 10, wherein the processing unit further determines whether the substituted road section is a two-way road, and when the substituted road section is a two-way road, selects a specific lane direction from the two-way road for the second route planning result, wherein the specific lane direction is the same with the lane direction from the starting point to the destination point.

12. A machine-readable storage medium comprising a computer program, which, when executed, causes a device to perform a method for adjusting route planning results, and the method comprising:

generating a first route planning result by the device, wherein the first route comprises a starting point, a destination point, and a plurality of pass-through points there between;

displaying the first route planning result;

selecting at least one candidate road section in the first route planning result, wherein the candidate road section is a portion of a road in the first route planning result extending between two of the pass-through points of the first route;

dragging the candidate road section to a substituted road section, wherein the substituted road section is a portion of a road extending between two pass-through points that are not pass-through points of the first route; and re-generating a second route planning result according to the substituted road section, wherein the second route planning result passes through the substituted road section, and the candidate road section is excluded from the second route planning result.

13. The method of claim 1, further comprising:

determining whether the substituted road section is an infeasible road section;

when the substituted road section is not an infeasible road section, re-generating the second route planning result according to the substituted road section; and when the substituted road section is an infeasible road section, generating a warning message.

14. The method of claim 13, wherein the determination of whether the substituted road section is an infeasible road section is performed by determining whether a current navigation mode is a predetermined mode, and whether the substituted road section is a freeway, and when the current navigation mode is the predetermined mode, and the substituted road section is the freeway, the substituted road section is determined as the infeasible road section.

15. The method of claim 13, wherein the determination of whether the substituted road section is an infeasible road section is performed by determining whether the substituted road section is a one-way road, and whether the one-way road causes a detour requirement, when the substituted road section is the one-way road, and the detour requirement occurs, the substituted road section is determined as the infeasible road section.

16. The system of claim 7, wherein the processing unit further determines whether the substituted road section is an infeasible road section, and when the substituted road section is not an infeasible road section, re-generates the second route planning result according to the substituted road section, and when the substituted road section is an infeasible road section, generates a warning message.

17. The system of claim 16, wherein the determination of whether the substituted road section is an infeasible road section is performed by determining whether a current navigation mode is a predetermined mode, and whether the substituted road section is a freeway, and when the current navigation mode is the predetermined mode, and the substituted road section is the freeway, the substituted road section is determined as the infeasible road section.

18. The system of claim 16, wherein the determination of whether the substituted road section is an infeasible road section is performed by determining whether the substituted road section is a one-way road, and whether the one-way road causes a detour requirement, and when the substituted road section is the one-way road, and the detour requirement occurs, the substituted road section is determined as the infeasible road section.

* * * * *